(12) United States Patent
Hoffman

(10) Patent No.: US 7,006,492 B2
(45) Date of Patent: Feb. 28, 2006

(54) METHOD AND APPARATUS FOR CONNECTING NETWORKS OF DIFFERENT TYPES OF TRANSMISSION

(75) Inventor: Klaus Hoffman, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 817 days.

(21) Appl. No.: 09/682,184

(22) Filed: Aug. 1, 2001

(65) Prior Publication Data

US 2002/0073239 A1    Jun. 13, 2002

(30) Foreign Application Priority Data

Aug. 1, 2000    (DE) ............................... 100 37 473

(51) Int. Cl.
*H04L 12/66*    (2006.01)

(52) U.S. Cl. ...................... 370/354; 370/353; 370/355; 370/356

(58) Field of Classification Search ......... 370/352–356
See application file for complete search history.

(56) References Cited

U.S. PATENT DOCUMENTS 6,570,869 B1 *    5/2003    Shankar et al. ............. 370/352
2003/0227908 A1 *   12/2003    Scoggins et al. ........... 370/352

OTHER PUBLICATIONS

Newton, Newton's Telecom Dictionary, Oct. 1998, Telecom Books, p. 613 and 656.*

* cited by examiner

*Primary Examiner*—Chi Pham
*Assistant Examiner*—Ronald Abelson
(74) *Attorney, Agent, or Firm*—Bell, Boyd & Lloyd LLC

(57) ABSTRACT

A method and apparatus for connecting networks of different types of transmission wherein, in a first network, the data are transmitted in a circuit-switched manner, and in a second network, the data are packet switched and transmitted connectionlessly on the lower three protocol levels. To be able to perform the signaling in a simple manner, signaling units are used which process signaling messages of the circuit-switched network.

16 Claims, 5 Drawing Sheets

FIG 4

| | 7 | 6 | 5 | 4 | 3 | 2 | 1 | 0 | |
|---|---|---|---|---|---|---|---|---|---|
| ID | 0 | 0 | 0 | 0 | 0 | 0 | 1 | 0 | ~182 |
| Length | 0 | 0 | 0 | 0 | 0 | 1 | 0 | 0 | ~184 |
| Length | 0 | 0 | 0 | 0 | 0 | 0 | 0 | 0 | ~185 |
| Comp | | | | | | | | | ~186 |
| RTP port | | | | | | | | | ~188 |

180

METHOD AND APPARATUS FOR CONNECTING NETWORKS OF DIFFERENT TYPES OF TRANSMISSION

BACKGROUND OF THE INVENTION

The present invention relates to a method for connecting networks of different types of transmission, in which the user data are transmitted as data packets between two network access units in a packet-transmitting network. The transmission in the network is also based on the transmission of data packets.

The data packets have a packet header which contains the address of a destination and the address of the sender. In addition, there is a data packet body in which the user data are transmitted.

The user data are forwarded connectionlessly by network nodes between the network access units. In this context, connectionlessly refers to the idea that no connection setup phase related to the packets to be transmitted is required for forwarding the data packets and that no switching resources are exclusively reserved for transporting the data packets to be transmitted.

A typical example of a packet-transmitting network in which the data packets are transmitted connectionlessly between the network nodes is the Internet. In the bottom three protocol layers of the so-called OSI (Open System Interconnection) model; i.e., in the physical layer, in the datalink layer and in the network layer, the data are transmitted connectionlessly in the Internet. Connections are only used from the transport layer on, if necessary. For example, the TCP (Transmission Control Protocol) protocol is used. Another protocol for the fifth protocol layer is the RTP (Real Time Protocol) protocol which is used for transmitting real-time data, particularly voice data.

On the other hand, there are the circuit-switched networks in which time channels are combined. An example of such a network is the conventional telephone network. These networks are also called circuit-switched networks because connections are switched through for transmitting data, especially voice data, even at the lower protocol levels. Thus, resources are reserved for each connection in the exchanges.

It is an object of the present invention, therefore, to specify a simple method for connecting a packet-based and connectionlessly transmitting network and a circuit-switched network. In addition, associated units, associated programs and data media and data network messages with these programs are to be specified.

SUMMARY OF THE INVENTION

The present invention is based on the idea that, on the one hand, the type of transmission of the user data must be changed and that, on the other hand, a solution must be found for the signaling in order to connect the networks of different types of transmission. In the method according to the present invention, the network access units divide user data received in data channels to data packets and, respectively, collect user data received as data packets and forward them in data channels.

In the solution to the problem of the signaling, a simple message can be achieved, in particular, if signaling methods normally used in the circuit-switched network can be retained. This is possible if a signaling unit which processes signaling messages of a circuit-switched network is, in each case, used for controlling the network access units.

In the circuit-switched network, the destination of the transmission is known. In the packet-based network, on the other hand, the destination of the transmission is not known. However, this is required in order to set up a connection between the network access units of the packet-based network at higher protocol levels. This is because addresses which are to be used for receiving data packets must be exchanged between the network access units. For this reason, the signaling units, which know both the destination of the transmission and the two network access units, are used for controlling the connection. The signaling units exchange messages with at least one information element. The information element contains the address of the transmitting network access unit in the packet-based network and an identifier for designating a connection of the relevant network access unit at a higher protocol level. The information element is received in the partner signaling unit and sent to a partner network access unit. Since, however, the partner network access unit cannot respond in the conventional signaling manner, either, corresponding information elements are also sent from the partner signaling unit to the signaling unit sending first.

By including two signaling units, signaling units and network access units can belong to different network operators. But even with only one operator, the method according to the present invention makes it possible to distribute the load over a number of signaling units.

The connectionlessly operating packet-based network and the circuit-switched network can be connected in a simple manner by this procedure. In particular, it is possible, according to the method of the present invention, to leave the signaling protocol used between the signaling units unchanged in comparison with the signaling protocol normally used in the circuit-switched network. This provides for quick adaptation to the method according to the present invention. Maintenance of the software components is facilitated since no, or only very few, additional software modules need to be generated and maintained.

In a further development of the method according to the present invention, separate information elements are used for transmitting the address and the identifier. This measure makes it possible to meet the requirements of predetermined standards, for example the Q.765 standard (Application Transport Mechanism) which has been specified by the ITU-T (International Telecommunication Union—Telecommunication Standardisation Sector).

In another development of the present invention, the information elements are structured in accordance with the Q.765 (1998) standard or a standard evolved from this standard. This measure provides for the interaction of signaling units of various manufacturers. The standard specifies a container which is also called BAT (Bearer Association Transport) or ATP (Application Transport Parameter), see Q.765, annex T, section Q.763. A value which points to the method according to the present invention is specified for an identifier contained in a container, which is also called the Application Context Identifier. The container itself then contains the information elements.

In a further embodiment, the information element for the address contains, in the following order:
- a tag for identifying the information element, preferably having the value 3.
- an item on the length of the information element.
- an item with compatibility information which tells the receiver what to do when he cannot process the information element; e.g., release the connection or continue nevertheless.

if necessary, an item on the format of the information element.

if necessary, an item on the transmission protocol version; e.g., on the Internet protocol version.

the address; e.g., an Internet address.

The item on the Internet protocol version is used during a transition time in which Internet addresses of both versions are used.

In another embodiment, the information element for the identifier contains, in the following order:

a tag for identifying the information element, preferably having the value 2.

an item on the length of the information element.

an item with compatibility information.

the identifier itself.

The information elements for the address and the identifier have a header which is built up in the same way and which contains, in this order, bytes for identifying the information element, for specifying the length of the information element and for specifying the compatibility. Due to the identical head configuration, uniform methods can be used for processing the information elements.

In a further development of the present invention, the packet-based network is the Internet or a network operating in accordance with the Internet protocol; e.g., an Intranet within a company. However, the method according to the present invention is also used in other networks which transmit data packets and operate connectionlessly up to protocol layer three.

In another further development, one of the signaling units controls a network node or each of the two signaling units in each case controls one network node in a circuit-switched network. Due to this measure, the signaling units have a dual function; namely, for switching in the circuit-switched network and for connecting the networks of different types of transmission. Program parts can thus be used several times. A number of functional units in the signaling units are used in both functions.

For signaling between the network access units, a protocol for real-time data transmission, preferably the RTP (Real Time Protocol) protocol, is used in another further development. In this case, real time refers to comparatively short delay times being produced during the transmission; for example, less than about 250 ms. This does not result in any significant impairments in the transmission of user data which contains speech, such as those which occur in telephone calls. The RTP protocol has been defined in the de facto standard RFC (Request For Comment) 1889 by the IETF (Internet Engineering Task Force).

Between the signaling units, the messages are exchanged according to the Q.763 protocol and/or according to the Q.764 protocol in a next further development. These protocols have been specified by the ITU-T (International Telecommunication Union—Telecommunication Standardisation Sector) and are the core of the ISUP (ISDN User Plane) protocol. Excepting only the information elements, if necessary, these protocols are used as specified in the standard or with only relatively small implementation-related deviations from the standards. In particular, a code for designating the call entity only has the length of two bytes prescribed in the standard, one half byte of which can still remain unused as dummy code. This code is also called CIC (Call Instance Code), compare standard Q.763, section 9.1. The methods for transmitting the messages, specified in the Q.764 standard (Signalling System No. 7—ISDN User Part Signalling Procedures) are also used unchanged. As a result, only small changes to previously used programs are necessary for carrying out the method according to the present invention or its further developments. Nevertheless, the requirements of the standards are met.

In an embodiment, the information element is forwarded as component of a message according to a protocol, namely in the above mentioned container, according to the Q.763 and Q.764 standards. Such an embedding of information elements outside the protocol is also called tunneling. Tunneling is a simple way of using an existing standard and still transmitting new information elements. In the standards, messages are already specified, the content of which can be freely selected and which are thus suitable for tunneling.

In another embodiment of the present invention, the network access units are units remote from the signaling units. The remote units have at least their own processor and have at least their own Internet address under which they can be reached by the signaling units and under which they can receive voice data packets. The network access units are preferably set up separately from the control units; i.e., they have their own housing and their own power supply connection. Due to this further development, network access units and control units can be installed at different sites. In addition, network access units and control units also can be made by different manufacturers.

In an embodiment with remote network access units, a standardized protocol is used for transmitting messages between the network access unit and the respective control unit. A suitable protocol is, for example, the protocol specified in the de facto standard RFC (Request For Comment) 2705 by the IETF (Internet Engineering Task Force).

The packet-based network can be used as carrier for the messages between the signaling units and the network access units. However, the transmission of the messages is not restricted to such a network. In particular, messages are also transmitted via circuit-switched networks.

The present invention also relates to a device for connecting networks of different types of transmission. The device carries out the method steps of the method according to the present invention or one of its further developments, which steps are related to the signaling unit. Thus, the above mentioned technical effects also apply to the device.

Furthermore, the present invention relates to a network access unit for connecting networks of different types of transmission. The network access unit carries out the method steps of the method according to the present invention or one of its further developments, which steps are related to the network access unit. Thus, the above mentioned technical effects also apply.

The present invention also relates to programs, upon the execution of which the device of the present invention or, respectively, the network access unit of the present invention, or its further developments, are controlled. In addition, a data medium and a data network message are protected by such a program. The data medium is, for example, a storage unit; e.g., a compact disk. The data network message is transmitted, for example, via the Internet.

Additional features and advantages of the present invention are described in, and will be apparent from, the following Detailed Description of the Invention and the figures.

BRIEF DESCRIPTION OF THE DRAWINGS

FIG. 4 shows the structure of an information element for transmitting an RTP port number.

DETAILED DESCRIPTION OF THE INVENTION

Figure 1:
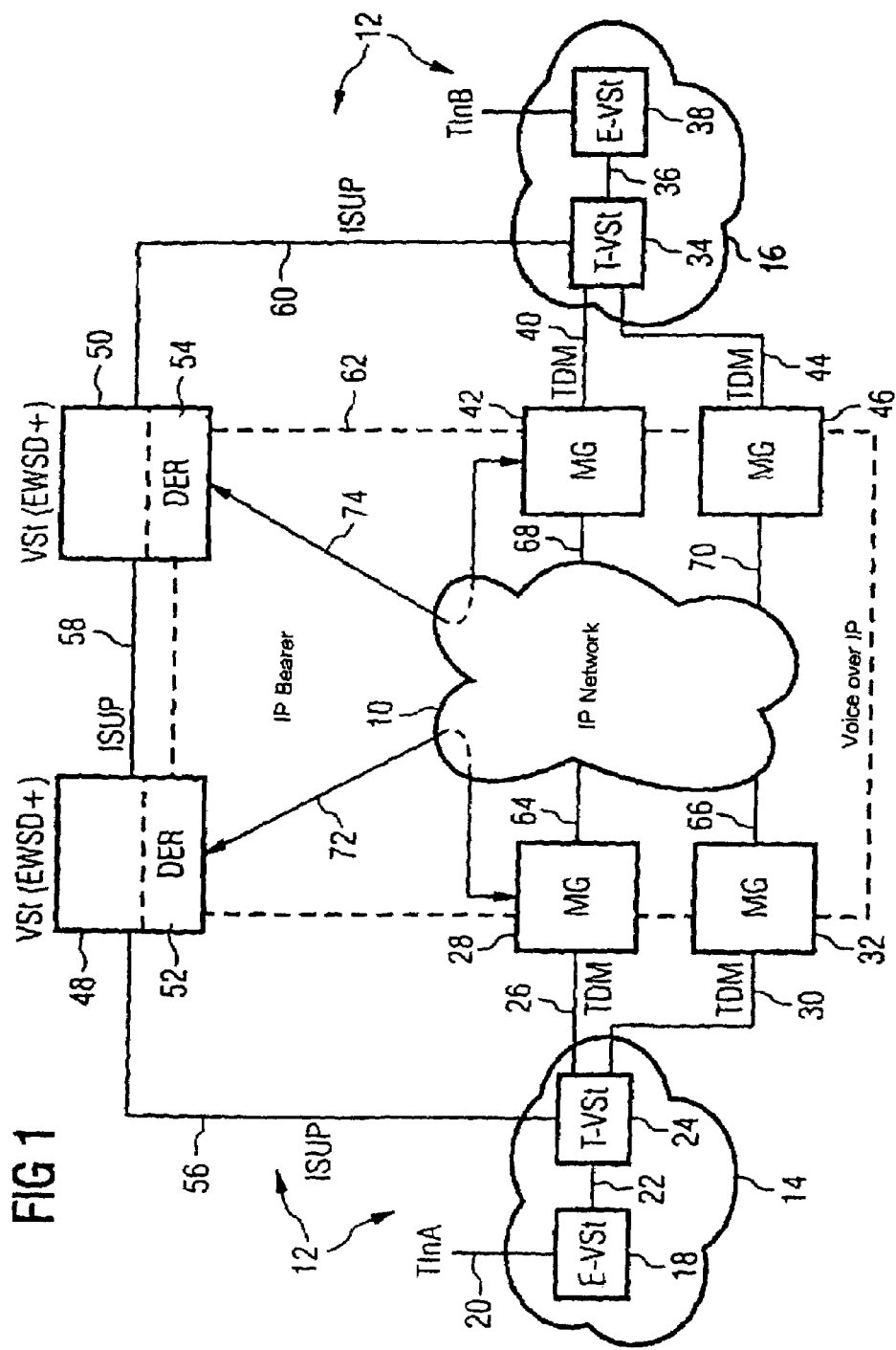
FIG. 1 shows a telecommunication network connected to the Internet.

FIG. 1 shows a telephone network 12, connected to the Internet 10; e.g., the telephone network of Telecom AG. FIG. 1 shows two parts 14 and 16 of the telephone network 12. Part 14 is located, for example, in southern Germany and part 16 in northern Germany. In part 14, a terminal exchange 18 is shown to which a subscriber TlnA is connected via a transmission line 20; e.g., via an ISDN (Integrated Services Digital Network) access. The terminal exchange 18 is connected to a transit exchange 24 via an interoffice trunk 22. The transit exchange 24 is, for example, a conventional exchange of the EWSD (digital electronic switching system) type of the Siemens AG company. A transmission link 26 leads from the transit exchange 24 to a network access unit 28. The transmission link 26 is, for example, a channel of a PCM (Pulse Code Modulation) 30 system which is otherwise used for transmitting voice data between various exchanges. The connections between various exchanges are also called trunks.

A transmission link 30 leads from the transit exchange 24 to another network access unit 32. The function of the network access units 28 and 32 will be explained below.

Part 16 of the telephone network 12 contains a transit exchange 34; e.g., of the EWSD type. The transit exchange 34 is connected via an interoffice trunk 36 to a terminal exchange 38 to which a subscriber TlnB is connected. A transmission link 40 of the transit exchange 34 leads to a network access unit 42. A further transmission link 44 leads from the transit exchange 34 to a network access unit 46. The transmission links 40 and 44 are, for example, PCM channels such as are normally used for transmitting voice data between exchanges. The operation of the network access units 42 and 46 will be explained below.

The telephone network 12 also contains two exchanges 48 and 50 which are further developments of the exchanges of the EWSD type. In addition to the functions of an exchange of the EWSD type, the exchanges 48 and 50 also take over the functions of service-providing computers 52 and 54. These additional functions are explained, in particular, below in connection with FIG. 2. Between the exchange 58 and the transit exchange 24, a signaling link 56 can be set up on which signaling messages are transmitted in accordance with the ISUP (ISDN User Part) protocol. Examples of messages of this protocol also will be explained below with reference to FIG. 2.

Between the exchanges 48 and 50, a signaling link 58 can be set up. The signaling messages over this signaling link are also transmitted in accordance with the ISUP protocol. Information elements are transmitted in a container according to the Q.765 (1998) standard. These information elements will be explained below with reference to FIG. 3 and FIG. 4.

Between the exchange 50 and the transit exchange 34, a signaling link 60 can be set up on which signaling messages are transmitted according to the ISUP protocol.

Both the telephone network 12 and the Internet 10 are used for transmitting voice data between subscriber TlnA and subscriber TlnB. The voice data are transmitted circuit-switched in voice channels within the telephone network 12. In the Internet 10, in contrast, the voice data are transmitted in data packets. The boundary between the telephone network 12 and the Internet 10 is indicated by a dashed line 62.

In the network access units 28, 32, 42 and 46, voice data which are, in each case, received in voice channels are divided into data packets and forwarded into the Internet 10. Data packets with voice data coming from the Internet 10 are depacketized in the network access units 28, 32, 42 and 46 and forwarded into the telephone network 12 in voice channels. The network access units 28, 32, 42 and 46 are connected to the Internet 10 in this order via transmission links 64 to 70 so that data packets can be exchanged between the network access units 28, 32, 42 and 46 via the Internet 10. The service-providing computers 52 and 54 are also connected to the Internet 10. Thus, data packets also can be exchanged between the service-providing computers 52 and 54, respectively, and the network access units 28, 32, 42 and 46, see signaling path 72 and 74, respectively, between the service-providing computer 52 and the network access unit 28 and between the service-providing computer 54 and the network access unit 42, respectively. The network access units 28, 32, 42 and 46 and the service-providing computers 52 and 54 have, in each case, at least one Internet address at which they can be reached in the Internet 10.

Figure 2:
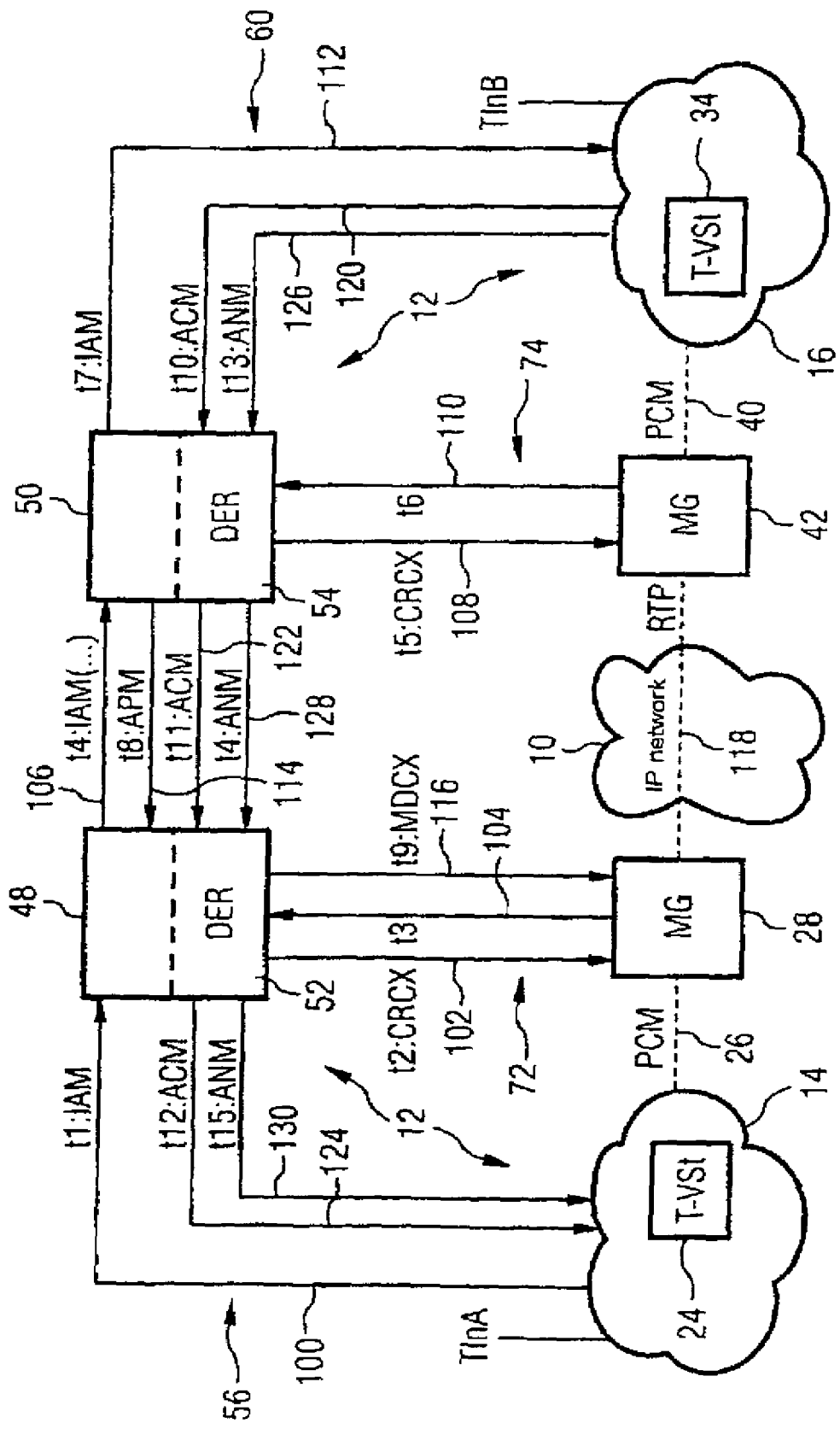
FIG. 2 shows signaling messages exchanged in the connected networks.

FIG. 2 shows signaling messages for setting up a connection between subscriber TlnA and subscriber TlnB. Functional units explained in FIG. 1 have the same reference symbols in FIG. 2. When a call connection is set up between subscriber TlnA and subscriber TlnB, the transit exchange 24 generates, according to protocol, a connection setup message 100, also called IAM (Initial Address Message) message at a time t1. Among other things, this message contains the complete telephone number of the subscriber TlnB in the telephone network 12 and the number of a time slot to be used for the transmission on the transmission link 26. The connection setup message 100 is transmitted via the signaling link 56. After the connection setup message 100 has been received, a program is executed in the exchange 48, during the execution of which it is determined that the Internet 10 can be used for the transmission of the voice data. It is determined that the network access unit 28 can be utilized as interface between telephone network 12 and Internet 10 on the side of the subscriber TlnA. A control unit of the exchange 48 causes the service-providing computer 52 to execute the steps necessary for this.

At a time t2 after the time t1, the service-providing computer 52 sends a connection setup message 102 according to the de facto standard RFC2705 to the network access unit 28 via the signal link path 72. The connection setup message 102 is also called the CRCX (Create Connection) message. In the connection setup message 102, the time slot is specified which is to be used for the user data transmission. The network access unit 28 processes the connection setup message 102 and, as a response, generates a response message 104 at a time t3. The response message 104 confirms reception of the connection setup message 102, on the one hand, and contains, among other things, an Internet address and a port number which can be used for receiving user data for an RTP connection to be set up between the network access unit 28 and the network access unit 42 and which is now allocated to the time slot.

The service-providing computer 52 receives the response message 104 and forwards the received Internet address and port number to the control unit of the exchange 48. The control unit of the exchange 48 processes the connection setup message 100 in accordance with the ISUP protocol and generates a connection setup message 106 at a time t4. The connection setup message 106 is also called an IAM message according to ISUP protocol. The connection setup message 106 contains two information elements explained in more detail below with reference to FIGS. 3 and 4 in which the Internet address and the port number are forwarded. These information elements are not specified in the ISUP standard but are transmitted via the signaling link 58 adhering to the ISUP standard. This is also called tunneling.

The exchange 50 receives the connection setup message 106 and also processes the information elements contained in it. On the basis of the content of these information elements or via the code (CIC) identifying the call entity, it is recognized that is not a usual telephone connection but a telephone connection using the Internet 10 which is to be set up. The exchange 50 determines that it is the network access unit 42 which is the network access unit to be used on the side of the subscriber TlnB. In addition, the exchange 50 determines a time slot which would have to be used if the user data transmission between exchanges 50 and 34 were exclusively circuit-switched. This time slot designates a transmission channel of the transmission link 40. The control unit of the exchange SO causes the service-providing computer 54 to set up an Internet connection via the signaling path 74. At a time t5, the service-providing-computer 54 sends a connection setup message 108 to the network access unit 42. The connection setup message 108 corresponds to the aforementioned de facto standard RFC 2705 and is also called a CRCX (Create Connection) message. The message 108 contains the Internet address sent by the network access unit 28 via the exchange 48, and the port number which is to be used for the RTP connection to be set up. In addition, the time slot determined by the exchange 50 is specified in the connection setup message 108.

During the processing of the connection setup message 108 in the network access unit 42, an Internet address and an as yet unoccupied port number of the network access unit 42, which can be used for the reception of the user data packets by the network access unit 28, are determined for the specified time slot. The network access unit 42 then sends a response message 10 at a time t6 in order to confirm the reception of the connection setup message 108. The response message 110 also contains the Internet address of the network access unit 42 determined and the port number determined.

The remaining part of the connection setup message 106 is processed in accordance with the ISUP protocol in the exchange 50. During this process, a connection setup message 112 is generated which is transmitted to the transit exchange 34 via the signaling link 60. The connection setup message 112 is also called an IAM (Initial Address Message) message. The connection setup message 112 contains, among other things, the call number of the subscriber TlnB and the time slot predetermined by the exchange 50. In the transit exchange 34, the connection setup message 112 is processed according to protocol and forwarded to the terminal exchange 38. The terminal exchange 38 calls the terminal of the subscriber TlnB.

During the processing of the connection setup message 106, after the reception of the response message 110, a response message 114, which is also called an ATM (Application Transport Message) message in accordance with the ISUP protocol, is generated in the exchange 50. The response message 115 contains an information element with the Internet address of the network access unit 42 and an information element with the port number transmitted by the network access unit 42. The response message 114 is transmitted to the exchange 48 at a time t8.

The control unit of the exchange 48 extracts the Internet address and the port number from the response message 114 and causes the service-providing computer 52 to forward these connection parameters to the network access unit 28. For this purpose, the service-providing computer 52 sends a modification message 116 according to de facto standard RFC 2705 at a time t9. The modification message 116 is also called an MDCX (Modify Connection) message. The modification message 116 contains the Internet address of the network access unit 42 and the port number of the network access unit 42, which is to be used for the RTP connection to be set up.

The modification message 116 is processed in the network access unit 28 and a direct transmission path 118 can be used for transmitting user data between the network access unit 28 and 42 in accordance with the RTP protocol. A response message to the modification message 116, generated by the network access unit 28, is not shown in FIG. 2.

At a subsequent time t10, the transit exchange 34 generates, according to protocol, a message 120 which is also called an ACM (Address Complete Message) message and signals that all dialing digits have been transmitted in order to connect subscriber TlnA and subscriber TlnB. The message 120 is processed by the control unit of exchange 50 in accordance with protocol. At a time t11, the exchange 50 sends an ACM message 122 to the exchange 48 according to the ISUP protocol. The exchange 48 processes the ACM message 122 and, in turn, sends an ACM message 124 to the transit exchange 24.

If the subscriber TlnB accepts the call, it will be signaled to the transit exchange 34 in accordance with the ISUP protocol. At a time t13, the transit exchange 34 generates a response message 126 which is transmitted to the exchange 50 via the signaling link 60. The response message 126 is also called an ANM (Answer Message) message. On the basis of this message, for example, the call begins to be chargeable.

The response message 126 is processed in the exchange 50 in accordance with the protocol. During this process, a response message 128 is sent to the exchange 48. The exchange 48 generates a response message 130 to the transit exchange 24 at a time t15 on the basis of the response message 128.

The voice data generated by the subscriber TlnA are transmitted in time slots in part 14 of the telephone network 12 and via the transmission link 26. Between the network access units 28 and 42, the voice data are transmitted in data packets according to the RTP protocol. On the transmission link 40 and in part 16 of the telephone network 12, the voice data are again transmitted in time slots.

The method explained with reference to FIG. 2 is used, for example, when other transmission links of the telephone network 12 are used to full capacity and/or when the use of the Internet 10 brings cost advantages for the operator of the exchanges 48 and 50 and lastly for the subscriber TlnA.

Figure 3:
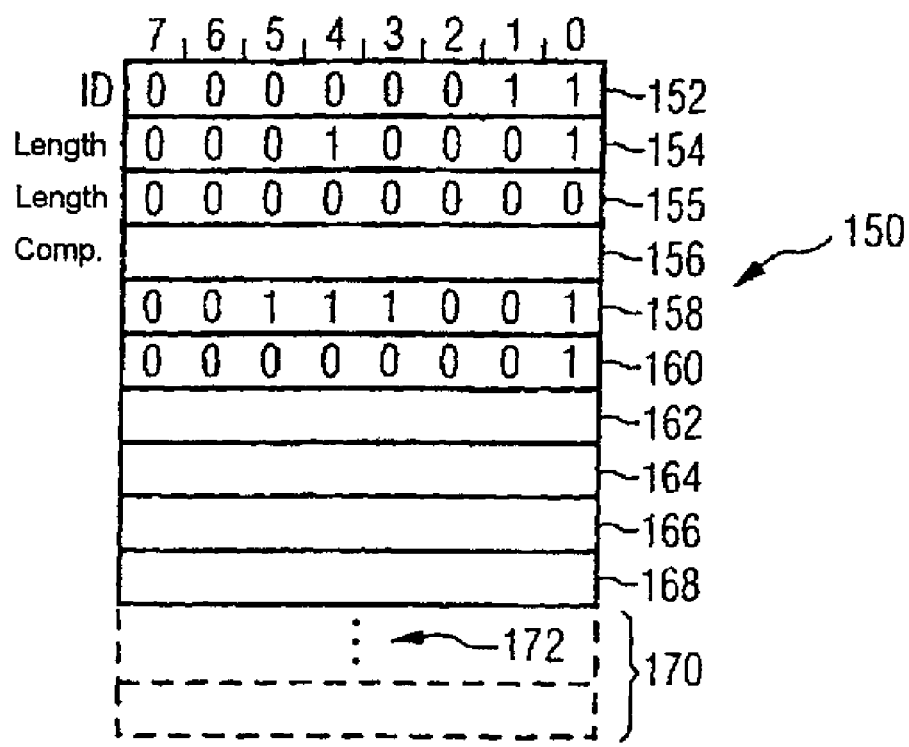
FIG. 3 shows the structure of an information element for transmitting an address.

FIG. 3 shows the structure of an information element 150 for transmitting an Internet address. In a first exemplary embodiment, the information element 150 contains ten successive data fields 152 to 168 which in each case have a length of eight bits; i.e., of one byte. Bit positions 0 to 7 are in this order from right to left. In data field 152, a tag (Interworking Function Address) for identifying the information element 150 is transmitted. The tag has the value 3 in order to indicate that the information element 150 is used for transmitting an Internet address.

The length of the information element 150 is specified in data fields 154 and 155. In the exemplary embodiment, the value nine is stored in data fields 154 and 155. Since the counting begins at zero, the information element 150 contains ten bytes.

In data field 156, compatibility information is transmitted, the value of which indicates to the receiver what to do if he cannot completely process the information element 150.

In data field 158, an authorization and format identifier is transmitted which has the value 35 in hexadecimal notation. According to the X.213 standard, annex 1, of the ITU, this value is used to indicate the Internet protocol.

In data field 160, a tag having the value one is stored if an Internet address according to Internet protocol Version 4 is transmitted. In the subsequent data fields 162 to 168, the four bytes of the Internet address according to Version 4 of the Internet protocol are then transmitted.

If, on the other hand, an Internet address according to Internet protocol Version 6 is to be transmitted with the aid of the information element 150, there is a deviation in the length item, see data field 154, and a deviation in data field 160. In data field 160, the value zero is transmitted in the case of the transmission of Internet addresses according to Internet protocol Version 6. In this case, sixteen data fields 162 to 170, in which the 16 bytes of the Internet address according to Internet protocol Version 6 are stored, follow the data field 160, see also dots 172.

FIG. 4 shows the structure of an information element 180 for transmitting a port number. The information element 180 contains five data fields 182 to 188 of one byte length in each case. The meaning of data fields 182 to 186 corresponds to the meaning of data fields 152 to 156 of information element 150 in this order. In data field 182, the value two is transmitted in order to identify the information element 180 as information element for transmitting a port number. The tag transmitted in data field 182 is also called "backbone network connection identifier". In data fields 184 and 185, the value four is transmitted. In the case of a count beginning with zero, this corresponds to a length of five bytes for information element 180. In data field 186, information on compatibility is transmitted. In data field 188, the port number to be transmitted is then transmitted; e.g., the port number to be used in network access unit 28 or, respectively, in network access unit 42 for the RTP connection, see FIGS. 1 and 2.

Figure 5:
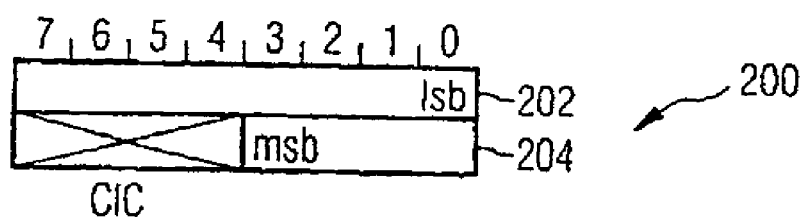
FIG. 5 shows the structure of a code element for designating the call entity.

FIG. 5 shows the structure of a code element 200 which is used for designating call entities between exchanges 48 and 50. The structure of code element 200 is specified in the Q.763 standard, section 9.1. Code element 200 contains two data fields 202 and 204 having, in each case, a length of one byte. The number of the entity is transmitted beginning with the least significant bit in data field 202, see bit position 0, up to bit position 7 of data field 202 and then on between bit positions 0 to 3 of data field 204. Bit positions 4 to 7 of data field 204 are not used for designating the entity.

Although the present invention has been described with reference to specific embodiments, those of skill in the art will recognize that changes may be made thereto without departing from the spirit and scope of the invention as set forth in the hereafter appended claims.

What is claimed is:

1. A method for connecting networks of different types of transmission, the method comprising the steps of:

transmitting user data as data packets between two network access units in a packet-based network;

forwarding the user data connectionlessly by network nodes between the two network access units;

receiving the user data in data channels at the network access units, wherein the user data is one of divided and depacketized as data packets and forwarded in data channels;

controlling the network access units via a signaling unit which processes signaling messages of a circuit-switched network; and exchanging signaling messages between the signaling units, wherein the signaling messages include at least one information element for at least one of transmitting an address of a network access unit and transmitting an identifier for identifying a connection of the relevant network access unit, and wherein the information element for the address includes a tag having a predetermined value for identifying the information element.

2. A method for connecting networks of different types of transmission as claimed in claim 2, wherein an event occurs which is at least one of the information element contains an address at which the network access unit in the packet-based network can receive user data packets, and the identifier specifies a connection at a higher protocol level in the transmission in the packet-based network which is intended for receiving the user data packets.

3. A method for connecting networks of different types of transmission as claimed in claim 1, the method further comprising the step of:

structuring the information elements in accordance with the Q.765 standard.

4. A method for connecting networks of different types transmission as claimed in claim 1, wherein the information element for the address contains, in the following order:

said tag having a value of 3 for identifying the information element;

an item referencing a length of the information element;

compatibility information;

an item referencing a format;

an item referencing a version of the transmission protocol for the data packets;

and the address.

5. A method for connecting networks of different types of transmission as claimed in claim 1, wherein the information element for the identifier contains, in the following order:

said tag having a value of 2 for identifying the information element;

an item referencing a length of the information element;

compatibility information; and the identifier.

6. A method for connecting networks of different types of transmission as claimed in claim 1, wherein the packet-based network is a network operating in accordance with the Internet protocol.

7. A method for connecting networks of different types of transmission as claimed in claim 1, the method further comprising the step of:

controlling a network node in a circuit-switched network via at least one of the signaling units.

8. A method for connecting networks of different types of transmission as claimed in claim 1, the method further comprising the step of:

carrying out signaling according to RTP protocol for real-time data transmission between the network access units.

9. A method for connecting networks of different types of transmission as claimed in claim 1, the method further comprising the steps of:
    exchanging messages according to at least one of the Q.763 protocol and the Q.764 protocol between the signaling units for connecting the networks; and
    using a code having at least one and one half bytes and at most two bytes for designating the call entity.

10. A method for connecting networks of different types of transmission as claimed in claim 9, the method further comprising the step of:
    forwarding at least one of the information elements as component of protocol-conformal messages according to the Q.763 protocol and the Q.764 protocol.

11. A method for connecting networks of different types of transmission as claimed in claim 1, wherein at least one network access unit is a unit remote from a control unit.

12. A method for connecting networks of different types of transmission as claimed in claim 11, wherein messages are transmitted according to one of the MGCP protocol and the H.248 protocol between a signaling unit and a network access unit.

13. A device for connecting networks of various types of transmission, comprising:
    an interface to a network access unit between a circuit-switched network and a packet-based network; and
    a signaling unit for exchanging signaling messages in accordance with a protocol for circuit-switched networks,
    wherein the signaling unit transmits signaling messages having at least one information element for at least one of transmitting the address of a network access unit and transmitting an identifier for identifying a connection of the relevant network access unit, and wherein the information element for the address includes a tag having a predetermined value for identifying the information element and wherein user data is forwarded connectionlessly between the network access units in the packet-based network.

14. A network access unit for connecting networks of various types of transmission, comprising:
    a conversion unit for at least one of dividing user data received in data channels into data packets and depacketizing user data received as data packets, and forwarding the user data in the data channels;
    an interface to a signaling unit which processes signaling messages of a circuit-switched network; and
    a control unit which transmits at least one of the address of the network access unit and an identifier for identifying a connection of the network access unit to the signaling unit in at least one information element, wherein the information element for the address includes a tag having a predetermined value for identifying the information element;
    wherein the user data are forwarded connectionlessly by network nodes between two network access units.

15. A program containing instructions, upon the execution of the instructions by a processor a device is controlled, wherein the device comprises an interface to a network access unit between a circuit-switched network and a packet-based network, and a signaling unit for exchanging signaling messages in accordance with a protocol for circuit-switched networks, wherein the signaling unit transmits signaling messages having at least one information element for at least one of transmitting the address of a network access unit and transmitting an identifier for identifying a connection of the relevant network access unit, and wherein the information element for the address includes a tag having a predetermined value for identifying the information element and wherein user data is forwarded connectionlessly between the network access units in the packet-based network.

16. A program containing instructions, upon the execution of the instructions by a processor a network access unit is controlled, wherein the network access unit comprises a conversion unit for at least one of dividing user data received in data channels into data packets and depacketizing user data received as data packets, and forwarding the user data in the data channels, an interface to a signaling unit which processes signaling messages of a circuit-switched network, and a control unit which transmits at least one of the address of the network access unit and an identifier for identifying a connection of the network access unit to the signaling unit in at least one information element, wherein the information element includes a tag having a predetermined value for identifying the information element, and wherein the user data are forwarded connectionlessly by network nodes between two network access units.

* * * * *